United States Patent [19]

McIntosh

[11] Patent Number: 4,489,621
[45] Date of Patent: Dec. 25, 1984

[54] DUAL WET OUTPUT CLUTCH FOR POWER SELECTION IN A CONTINUOUSLY VARIABLE TRANSMISSION

[75] Inventor: Arthur M. McIntosh, Arlington Heights, Ill.

[73] Assignee: Borg-Warner Corporation, Chicago, Ill.

[21] Appl. No.: 425,734

[22] Filed: Sep. 28, 1982

[51] Int. Cl.³ .................. F16H 3/14; F16H 3/08; F16D 19/00; F16D 21/08

[52] U.S. Cl. .................... 74/355; 74/330; 74/333; 74/361; 192/87.17

[58] Field of Search ........... 474/72; 192/87.16, 87.17, 192/87.18, 87.19, 51, 21, 48.91, 94, 89 A, 361; 74/329, 330, 331, 333, 377, 342, 343, 355, 356; 689, 476

[56] References Cited

U.S. PATENT DOCUMENTS

| | | | |
|---|---|---|---|
| 2,125,433 | 8/1938 | Dunkelow | 74/377 X |
| 2,149,020 | 2/1939 | Hering | 74/339 |
| 2,315,808 | 4/1943 | Miller | 74/343 |
| 2,325,647 | 8/1943 | Adamson | 74/377 X |
| 2,485,688 | 10/1949 | Banker | 192/87.19 |
| 2,700,312 | 1/1955 | Smirl | 74/763 |
| 2,733,613 | 2/1956 | Kreis | 74/330 X |
| 2,757,557 | 8/1956 | Hoffman | 192/87.19 |
| 3,566,707 | 3/1971 | Schulz | 74/377 |
| 3,745,847 | 7/1973 | Worner et al. | 74/339 |
| 3,802,294 | 4/1974 | Smirl | 74/759 |
| 4,060,012 | 11/1977 | Giacosa | 74/689 |
| 4,125,037 | 11/1978 | Palmer et al. | 74/732 |
| 4,228,691 | 10/1980 | Smirl | 474/12 |
| 4,241,618 | 12/1980 | Smirl | 74/863 |
| 4,290,320 | 9/1981 | Abbott | 74/689 |
| 4,304,144 | 12/1981 | Takahashi | 74/476 X |
| 4,304,150 | 12/1981 | Lupo et al. | 74/677 |
| 4,433,594 | 2/1984 | Smirl | 74/689 |

Primary Examiner—Allan D. Herrmann
Assistant Examiner—Stephen B. Andrews
Attorney, Agent, or Firm—James A. Geppert

[57] ABSTRACT

A dual wet output clutch for a continuously variable transmission which acts as a starting clutch upon a signal from a throttle induced hydraulic fluid supply to connect the transmission with the vehicle wheels and replaces a mechanical forward-neutral-reverse selection by hydraulic actuation of one of the dual clutches to provide forward or reverse power. Also, a secondary mechanism is utilized with the reverse gear to deactivate the reverse clutch in the forward mode and reduce drag loss.

9 Claims, 5 Drawing Figures

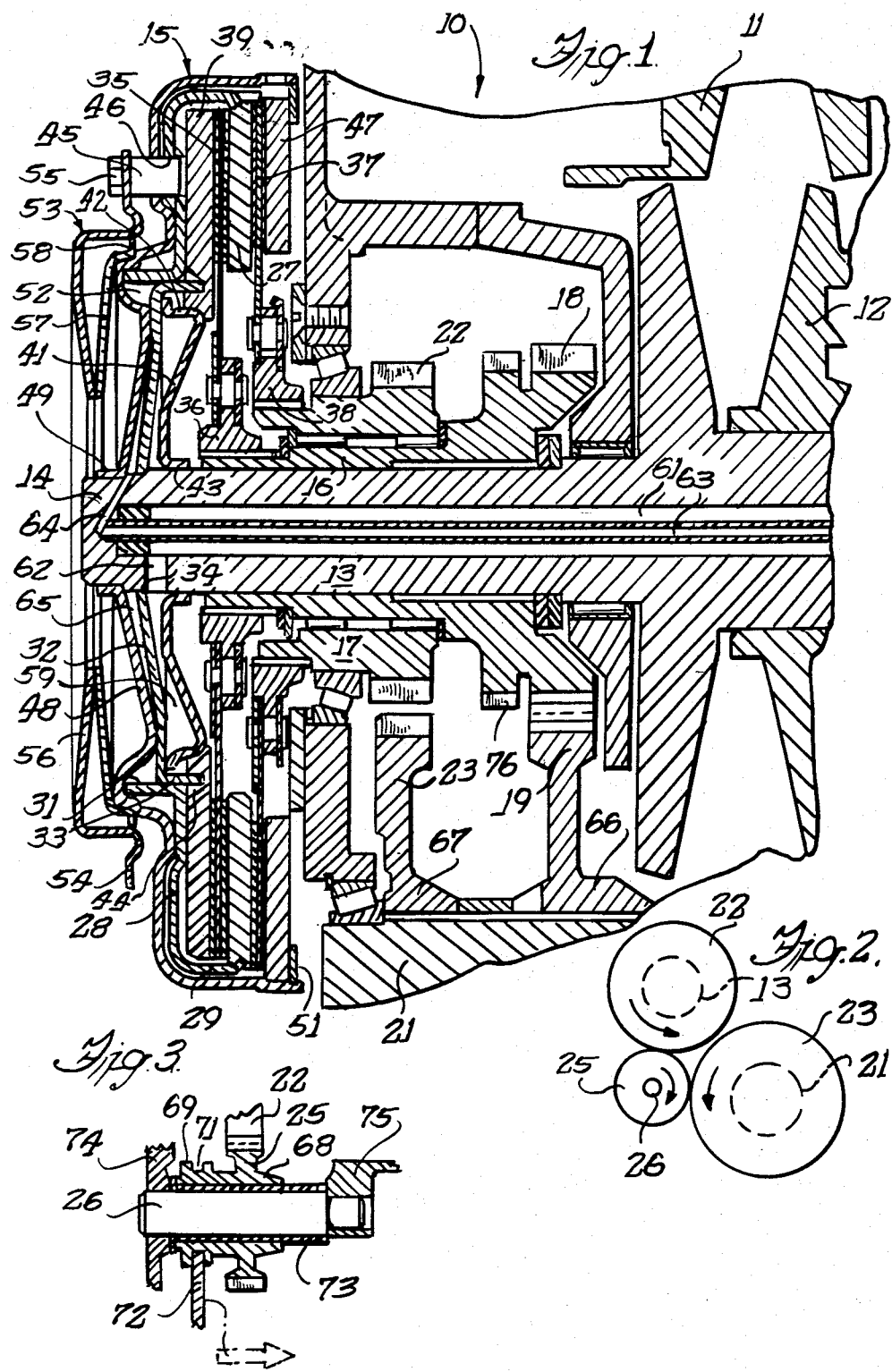

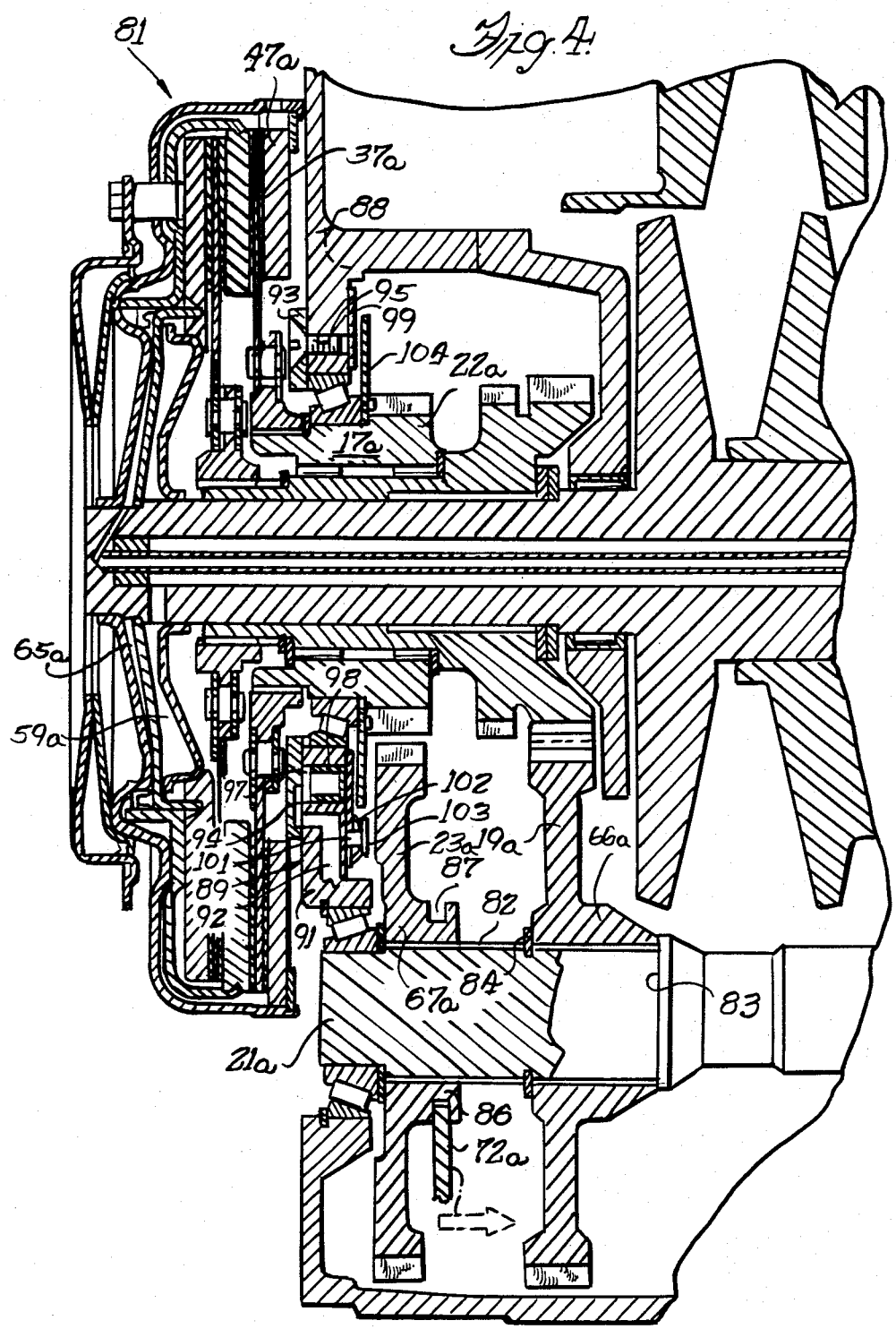

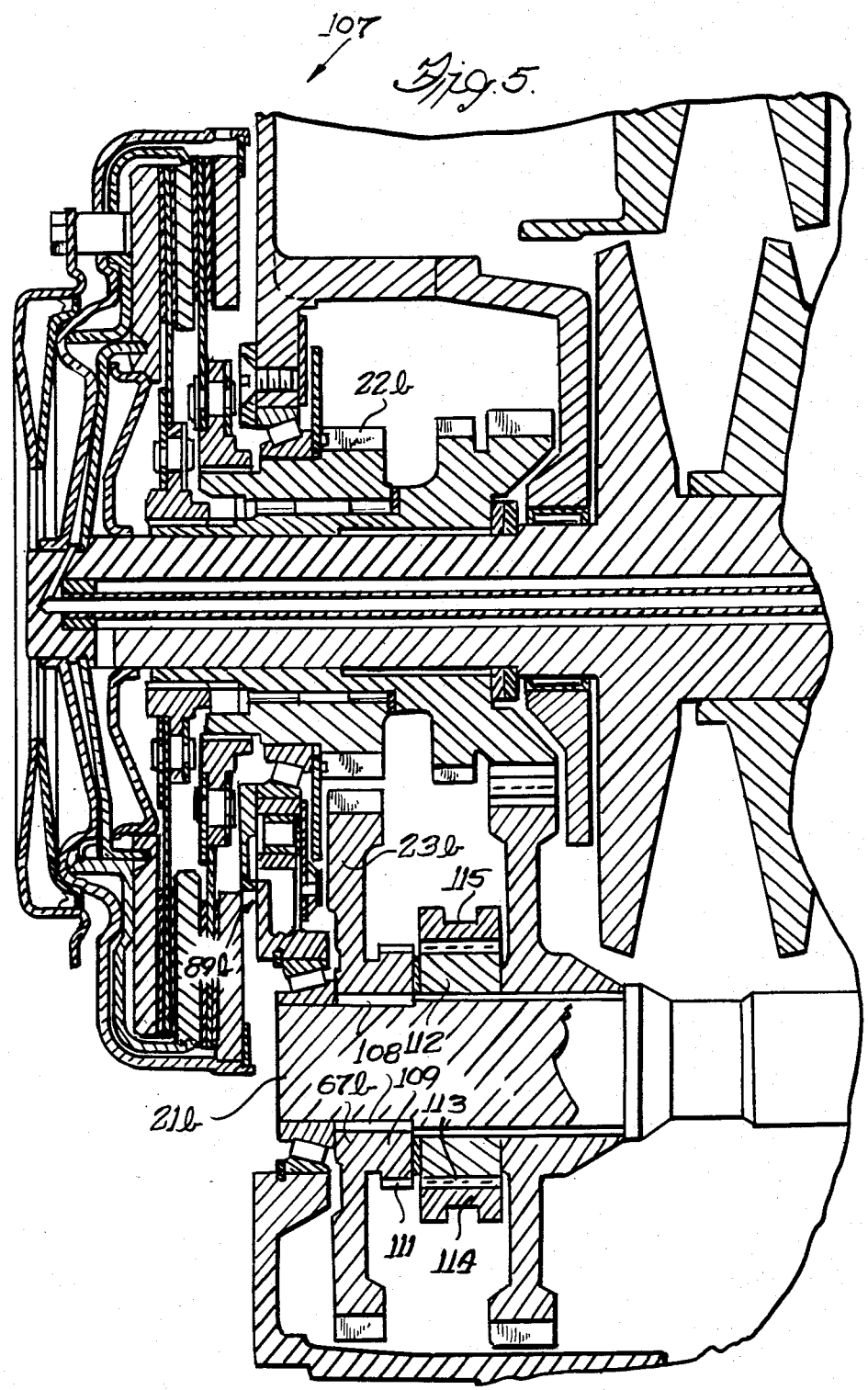

DUAL WET OUTPUT CLUTCH FOR POWER SELECTION IN A CONTINUOUSLY VARIABLE TRANSMISSION

BACKGROUND OF THE INVENTION

The present invention relates to a starting clutch for a continuously variable transmission that also provides for the selection of the power mode for a vehicle or other mobile equipment. Numerous versions of continuously variable transmissions utilizing variable pulleys and a continuous belt are presently known in the prior art, and the generally accepted arrangement for an automotive vehicle utilizes a clutch for a forward-neutral-reverse selector mechanism between the engine or prime mover and the variable pulleys. However, the rate at which the belt can be shifted diminishes as the pulley speed decreases. Also, the vehicle and pulleys must be brought to a complete halt in order to shift from forward to reverse with reversal of the direction of rotation of the pulleys.

To overcome these problems, the clutch and the selector mechanism have been transferred from a location between the engine and the pulleys to a position between the pulleys and the axle ratio and differential to the vehicle wheels, as shown in the Smirl U.S. Pat. No. 4,241,618. In this arrangement, the pulleys are continuously rotated, even at idle rpm, while the engine is running. Initiation of vehicle movement is accomplished by a speed-responsive friction starting device and the power mode, either forward or reverse, attained through a mechanical selector.

Also known in the prior art is the use of a dual clutch arrangement acting in a vehicle transmission. A dual clutch is utilized with each clutch plate being separately hydraulically actuated to provide for the forward speed ratios, reverse and neutral. However, the clutches are used to conjunction with friction brake bands engaging brake drums which operate in conjunction with one or more planetary gear sets. One major problem in this type of arrangement is the amount of drag losses that occur due to incomplete disengagement of the clutches and/or brake bands.

The present invention provides a non-mechanical power mode selector arrangement for a continuously variable transmission without the drag losses previously found in dual clutch transmissions.

SUMMARY OF THE INVENTION

The present invention relates to the provision of a novel dual starting clutch for a continuously variable transmission wherein the dual clutches independently provide for the forward and reverse power modes of the transmission to the vehicle wheels without halting or reversing the transmission to shift pulleys. The dual clutch arrangement provides one clutch disc operatively connected to the forward gear train for the vehicle wheels while the other clutch disc is operatively connected to the reverse gear train for the wheels. The clutch discs are separated by an intermediate pressure plate, and a hydraulically-actuated pressure plate is positioned on the side of each clutch disc opposite to the intermediate plate. Selective hydraulic actuation of either pressure plate will cause engagement with its respective clutch disc to initiate movement in the forward or reverse direction.

The present invention also comprehends the provision of a novel dual starting clutch for a continuously variable transmission wherein the independent clutch plates drive the forward gear set and the reverse gear set, and a reverse gear deactivation means is incorporated in the gear sets to deactivate the reverse clutch when in the forward drive mode to eliminate any drag loss of the reverse clutch. The deactivation means may take the form of shifting out of mesh either the idler gear or the reverse gear on the driven shaft or to provide a single jaw clutch on the driven shaft for the reverse gear. Also, a reverse clutch plate brake is disclosed to ease the re-engagement of gears in the reverse gear train.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a longitudinal cross sectional view of the dual clutch and gear set assembly as utilized for a continuously variable transmission.

FIG. 2 is a schematic end view showing the reverse gear set with the idler gear.

FIG. 3 is a partial cross sectional view of the idler gear on its idler shaft with means for its disengagement from the gear set.

FIG. 4 is a longitudinal cross sectional view of a dual clutch assembly with a second embodiment of reverse gear deactivation means and a reverse clutch plate brake.

FIG. 5 is a longitudinal cross sectional view of a dual clutch assembly with a third embodiment of reverse gear deactivation means and a reverse clutch plate brake.

DESCRIPTION OF PREFERRED EMBODIMENTS

Referring more particularly to the disclosure in the drawings wherein are shown illustrative embodiments of the present invention, FIGS. 1 through 3 disclose a continuously variable transmission and clutch assembly 10 for an automotive vehicle wherein a first variable pulley 11 on the driving shaft from the vehicle engine (not shown) drives a second variable pulley 12 through an endless belt (not shown) to constantly rotate a second shaft 13 on which the pulley 12 is mounted. A dual clutch assembly 15 is mounted on the stepped end 14 of shaft 13 to alternately drive a first sleeve shaft 16 and a second sleeve shaft 17, both encompassing the shaft 13. The first sleeve shaft at its rear end terminates in a forward gear 18 meshing with a similar gear 19 connected to a third or driven shaft 21 leading to the axle ratio and differential for rotation of the vehicle wheels. A reverse gear set includes a gear 22 at the rear end of the outer or second sleeve shaft 17, a gear 23 splined on the third shaft 21 and an idler gear 25 on an idler shaft 26 (FIG. 3) and meshing with both gears 22 and 23.

The dual clutch assembly 15 includes an intermediate annular pressure plate 27 mounted in an annular plate or support 28 having an axial outer flange 29 suitably secured onto the outer edge of pressure plate 27 and an inner flange 31 secured, as by welding, to the outer flange 33 of an annular pressure fluid distributing plate 32, which in turn has its inner diameter 34 secured to the shaft 13. A forward clutch plate 35 is secured to a hub 36 splined to first sleeve shaft 16 and positioned on one side of pressure plate 27, while a reverse clutch plate 37 is secured to a hub 38 splined to the second sleeve shaft 17 and positioned on the opposite side of pressure plate 27.

A first axially movable pressure plate 39 is located with respect to intermediate pressure plate 27 to sandwich the forward clutch plate 35 therebetween and is operatively connected to the outer flange 42 of an annular dished piston plate 41 having an inner flange 43 slidably mounted on the shaft 13. The pressure plate 39 has an annular groove 44 receiving the outer flange 33 of plate 32, and a plurality of collars 45, welded to the pressure plate 39, extend through openings 46 in the annular plate 28.

A second or reverse axially movable pressure plate 47 on the opposite side of intermediate pressure plate 27 from forward pressure plate 39 cooperates with pressure plate 27 to sandwich the reverse clutch plate 37 therebetween. This pressure plate 47 is operatively connected to an outer dished plate 48 and retained therein by snap ring 51; the outer plate extending around the annular plate 28 and inner piston 41 and terminating in an inner flange 49 slidably mounted on the stepped end 14 of shaft 13. The outer plate has openings receiving the collars 45 and an annular channel 52 accommodating the inner flange 31. A return spring assembly has a retainer 53 with an outer flange 54 secured between the collars 45 and the heads of bolts 55 threaded into the collars, an intermediate axial portion and an inner conical portion 56 bearing at its inner edge onto the inner edge of a conical spring 57 having an outer edge 58 contacting the channel 52 of the plate 48.

A first pressure chamber 59 is formed between the fluid distributing plate 32 and the piston plate 41 and communicates with an annular passage 61 for pressurized hydraulic fluid in the shaft 13 via one or more lateral passages 62. A center conduit in passage 61 forms a second passage 63 for hydraulic fluid extending through the axis of shaft 13 and passage 61 to terminate in one or more lateral passages 64 leading to a second pressure chamber 65 formed between the plate 32 and the outer plate 48. Appropriate annular resilient seals act to prevent leakage from the pressure chambers, and cooling fluid is admitted to the clutch plates 35 and 37 to cool the friction surfaces during engagement or disengagement.

The forward gear 19 on the driven shaft 21 is integral with hub 66 splined onto shaft 21, and the reverse gear 23 is integral with a hub 67 also splined on the shaft 21. As seen in FIG. 3, the idler gear 25 has an integral hub 68 with an axial extension 69 provided with an annular groove 71 receiving a shifter fork 72 or similar actuating member. An elongated bushing 73 encompasses the shaft 26 and extends between a pair of stop members 74 and 75, mounting the shaft 26 with the gear 25 rotatably mounted on the shaft by the bearing.

In the clutching arrangement as shown in FIG. 1, the dual clutch 15 provides problems of drag losses due to low clearance between the clutch plates and pressure plates upon disengagement thereof and viscous drag losses caused by the presence of the cooling fluid on and between the friction surfaces. Thus, when the forward clutch plate 35 is engaged between the pressure plates 27 and 39, the reverse clutch plate may be providing undesirable spin drag losses due to incomplete disengagement which reduce the efficiency of the total drive assembly. Also, when the reverse clutch plate 37 is engaged, there will be drag losses occasioned because of incomplete disengagement of the forward clutch plate, however, the drag losses in reverse are not of importance because the vehicle will be moving in reverse at relatively low speeds for a short distance. As drag losses are undesirable when the forward clutch is engaged, disengagement of the idler gear 25 is utilized to eliminate the reverse clutch plate drag losses by allowing the reverse clutch plate to rotate at the same speed as the remainder of the clutch assembly.

The vehicle operator controls movement of the vehicle by shifting a selector lever (not shown) which controls the feeding of pressurized hydraulic fluid through either passage 61 or 63. As the pulleys are constantly rotating, the engine also provides constant rotation of a fluid pump providing the hydraulic fluid. When the operator depresses the throttle to increase engine rpm, the pressure of the fluid from the pump is increased and, depending on the position of the control lever, either chamber 59 or 65 has a pressure increase. The movement of the shift fork 72 is suitably tied to the movement of the selector lever controlling fluid pressure to passages 61 and 63. In neutral or reverse mode, the fork moves the idler gear 25 along bearing 73 against the stop 74 so that the gear meshes with reverse gears 22 and 23; the selector lever when in the reverse mode directing fluid to the pressure chamber 65 to cause engagement of the reverse clutch plate 37 to rotate gears 22, 25 and 23 and the driven shaft 21 in one direction of rotation.

When the selector lever is shifted to the forward mode, the shifter fork 72 moves the idler gear 25 axially on the shaft 26 to a position adjacent stop member 75 and disengages idler gear 25 from the reverse gears 22 and 23. Also, fluid pressure is discontinued to chamber 65 and fluid is directed to pressure chamber 59, and the forward clutch plate 35 is engaged to rotate the gears 18 and 19 and the driven shaft 21 in the opposite direction. With the idler gear 25 disengaged, any drag occurring at the reverse clutch plate 37 will not be transmitted to the shaft 21 for more efficient operation. Disengagement of the idler gear 25 also reduces gear noise because the reverse gear train is not in mesh. The reverse gear teeth are preferably chamfered to permit engagement of the idler gear without blocking.

Although the reverse clutch deactivation means is shown in the form of a shifter fork for movement of the idler gear 25, the idler gear could be activated through the same hydraulic pressure control as for actuation of the forward and reverse clutches. The use of the dual clutch arrangement eliminates the necessity of a forward-neutral-reverse gearing mechanism with a synchronizer and shift fork, which should be less expensive with improved system reliability. A parking brake gear 76 is provided between the gears 18 and 22 to stop the vehicle transmission while in the parked position.

FIG. 4 discloses an alternate embodiment of dual clutch assembly 81 wherein like parts have the same reference numeral with a script a. Rather than shifting the idler gear 25 shown in FIG. 3, this embodiment contemplates the shifting of the reverse gear 23a on the driven shaft 21a. In this embodiment, the driven shaft is longitudinally splined at 82 for a substantial length of the shaft with the forward gear 19a having its internally splined hub 66a located on the splined portion 82 abutting a shoulder 83 and retained in position by a snap ring 84 received in an annular groove formed on the shaft. The internally splined hub 67a on reverse gear 23a allows the hub to reciprocate along the shaft and has an extension 86 with an annular groove 87 to receive a shifter fork 72a to move the reverse gear 23a from the engaged position shown in FIG. 4 axially along the shaft 21a to a position where the gear is completely disengaged from the idler gear (not shown).

To prevent drag from the reverse clutch plate 37a inhibiting idler or reverse gear shift into engagement, a braking arrangement 89 is mounted in the housing 88. This braking arrangement includes an annular portion 91 formed in the housing and having a hydraulic fluid inlet passage 92 leading to an annular distributor chamber 94 in an annular plate 93 secured to the housing by bolts 95; the plate being suitably sealed to the housing. A plurality of circumferentially equally spaced bores 97 are formed in portion 91 with each containing a cup-shaped piston 98 having its closed end abutting an annular pressure plate 99 mounted on the housing through the projections or pins 101 extending through complementary openings in the plate. A Belleville washer 102 is mounted on each pin and the pins are headed at 103 so that the washers urge the plate against the housing. An annular friction plate 104 is mounted on the sleeve shaft 17a abutting and keyed to the reverse gear 22a for rotation therewith.

The operation of this embodiment is similar to that of the assembly of FIG. 1, in that when the operator selects the forward mode, there is no fluid pressure in chamber 65a and pressure is directed to the chamber 59a. Simultaneously, the shift fork 72a moves the reverse gear 23a along the shaft 21a toward the forward gear 19a to disengage the gear 23a from the idler gear and allow the reverse clutch plate 37a, which is not under pressure from pressure plate 47a, to rotate at the same speed as the remainder of the clutch assembly and provide zero drag.

When the operator selects the reverse mode, fluid pressure is discontinued to chamber 59a and, with the reverse clutch plate snugged up, pressure is applied through passage 92 and chamber 94 to cause the pistons 98 to move and urge pressure plate 99 against the friction plate 104 to hold the reverse clutch plate from turning and permit the shift fork to move reverse gear 23a back into mesh with the idler gear. Then, there is a build up of pressure in chamber 65a while pressure in chamber 94 is discontinued to allow engagement of the reverse clutch plate. Upon cessation of pressure in chamber 94, the Belleville washers 102 urge the pressure plate 99 away from the plate 104 to retract pistons 98 and allow rotation of reverse gear 22a. Obviously, the braking assembly 89 of this embodiment could be utilized in the dual clutch assembly 15 shown in FIGS. 1 through 3 with equal effectiveness.

A third embodiment of dual clutch assembly 107 is shown in FIG. 5 with like parts having the same reference numeral with a script b. In this version, the reverse gear 23b is mounted on the driven shaft 21b by bearings 108 to rotate relative thereto, and the reverse gear hub 67b has an axial extension 109 with exterior splines 111 formed thereon. A collar 112 is splined onto the shaft 21b adjacent the forward gear 19b and has exterior splines 113 thereon identical to the splines 111. A single jaw clutch member 114 has interior splines engaging the collar splines 113 and may be moved axially by a shift fork (not shown) engaging a groove 115 on the member 114 to engage the collar with the splines 111 on the reverse gear hub extension 109. Also, the reverse gear braking arrangement 89b is shown and is utilized to retain the reverse gear 22b stationary to prevent rotation of the reverse clutch plate and allow engagement of the clutch member 114 with the reverse gear hub splines 111 when the operator shifts to the reverse mode before rotation of the reverse gears. Operation of the clutch assembly is substantially the same as the previous two embodiments.

Where it is desirable that the reverse idler gear or reverse driven gear remain in mesh should it be necessary to rock a vehicle in snow or mud, a simple control means can be provided to deactivate the reverse clutch brake and leave the gears in mesh. Shifting between forward and reverse would then be accomplished off of the respective clutches. This is possible because the disengagement of a gear in the reverse gear train is only necessary to reduce clutch drag losses and gear noise levels in forward gear. After the rocking action is complete, a reverse gear can be easily disengaged if the transmission is in forward gear.

I claim:

1. In a continuously variable transmission having a driving shaft from the transmission, a forward gear set and a reverse gear set between the driving shaft and a driven shaft, and a forward-neutral-reverse selector to determine which gear set rotates the driven shaft, the improvement including a dual clutch assembly between the driving and driven shafts and forming the forward-neutral-reverse selector, the dual clutch assembly including an intermediate pressure plate operatively connected to said driving shaft, a forward pressure plate on one side of said intermediate pressure plate and a reverse pressure plate on the opposite side thereof, each operatively connected to said driving shaft, a forward clutch plate positioned between the forward and intermediate pressure plates, a first sleeve shaft encompassing the driving shaft, operatively connected to said forward clutch plate and carrying a forward gear thereon, a reverse clutch plate positioned between the reverse and intermediate pressure plates, a second sleeve shaft encompassing said first sleeve shaft, operatively connected to said reverse clutch plate and carrying a reverse gear thereon, said reverse gear set including said reverse gear, a reverse gear mounted on said driven shaft for rotation therewith, and an idler gear on an idler gear shaft and meshed with said reverse gears, a source of hydraulic pressure to actuate the forward pressure plate axially toward the intermediate pressure plate to engage the forward clutch plate, a separate source of hydraulic pressure to independently actuate the reverse pressure plate axially toward the intermediate pressure plate to engage the reverse clutch plate, said separate sources of hydraulic pressure being alternately actuated so that only one of said forward and reverse gear sets is actuated at any one time, and means to disengage the reverse gear set from the driven shaft when the forward clutch plate is engaged comprising the shifting of a gear in the reverse gear set out of engagement with the remaining gears.

2. In a continuously variable transmission having a driving shaft from the transmission, a forward gear set and a reverse gear set between the driving shaft and a driven shaft, and a forward-neutral-reverse selector to determine which gear set rotates the driven shaft, the improvement including a dual clutch assembly forming the forward-neutral-reverse selector, the dual clutch assembly including an intermediate pressure plate operatively connected to said driving shaft, a forward pressure plate on one side of said intermediate pressure plate and a reverse pressure plate on the opposite side thereof, each operatively connected to said driving shaft, a forward clutch plate positioned between the forward and intermediate pressure plates, a first sleeve shaft encompassing the driving shaft, operatively connected to said forward clutch plate and carrying a forward gear thereon, a reverse clutch plate positioned between the reverse and intermediate pressure plates, a second sleeve shaft encompassing said first sleeve shaft, operatively connected to said reverse clutch plate and carrying a reverse gear thereon, said reverse gear set including said reverse gear, a reverse gear mounted on said driven shaft for rotation therewith, and an idler gear on an idler gear shaft and meshed with said reverse gears, a source of hydraulic pressure to actuate the forward pressure plate axially toward the intermediate pressure plate to engage the forward clutch plate, a separate source of hydraulic pressure to independently actuate the reverse pressure plate axially toward the intermediate pressure plate to engage the reverse clutch plate, said separate sources of hydraulic pressure being alternately actuated so that only one gear set is actuated at any one time, and means to disengage the reverse gear set from the driven shaft when the forward clutch plate is engaged including an elongated bearing on said idler shaft for longitudinal movement of said idler gear, and means to shift said idler gear into and out of meshing engagement with said reverse gears.

3. A dual clutch assembly in a continuously variable transmission as set forth in claim 2, in which said idler gear includes an axially extended hub, and said shifting means comprises a shift fork engaging said extended idler hub.

4. A dual clutch assembly in a continuously variable transmission as set forth in claim 1, in which said driven shaft includes elongated splines thereon for longitudinal movement of said reverse gear splined thereon, and means to shift said reverse gear on the driven shaft into and out of engagement with the idler gear.

5. A dual clutch assembly in a continuously variable transmission as set forth in claim 4, in which said driven shaft reverse gear includes an axially extended hub, and said shifting means comprises a shift fork engaging said extended reverse gear hub.

6. A dual clutch assembly in a continuously variable transmission as set forth in claim 1, including a reverse clutch brake assembly incorporated in a cover for the transmission, said brake assembly including a housing, a pressure plate mounted on guide pins on said housing and yieldably urged thereagainst, a friction plate mounted on said second sleeve shaft and keyed to said sleeve shaft reverse gear, and means to shift said pressure plate into frictional engagement with said friction plate.

7. A dual clutch assembly in a continuously variable transmission as set forth in claim 6, in which a Belleville washer is secured on each pin to urge said pressure plate away from said friction plate, said brake housing having a plurality of circumferentially spaced bores therein, and said shifting means comprises a hydraulically actuated piston in each bore adapted to engage said pressure plate.

8. A dual clutch assembly in a continuously variable transmission as set forth in claim 1, wherein said disengagement means comprises a jaw clutch splined onto a collar operatively connected to said driven shaft, said forward gear set including a forward gear splined onto said driven shaft, said reverse gear set including a reverse gear rotatably mounted on said driven shaft, said collar located between said last mentioned forward and reverse gears, said reverse gear having splines thereon adapted to be engaged by said jaw clutch, and means to shift said jaw clutch into and out of engagement with said reverse gear.

9. A dual clutch assembly in a continuously variable transmission as set forth in claim 8, wherein said driven shaft reverse gear includes an axially extending externally splined hub adjacent said collar, said splines being complementary to the splines of said jaw clutch, and said shifting means comprising a shift fork engaging said jaw clutch.

* * * * *